Figure 1:
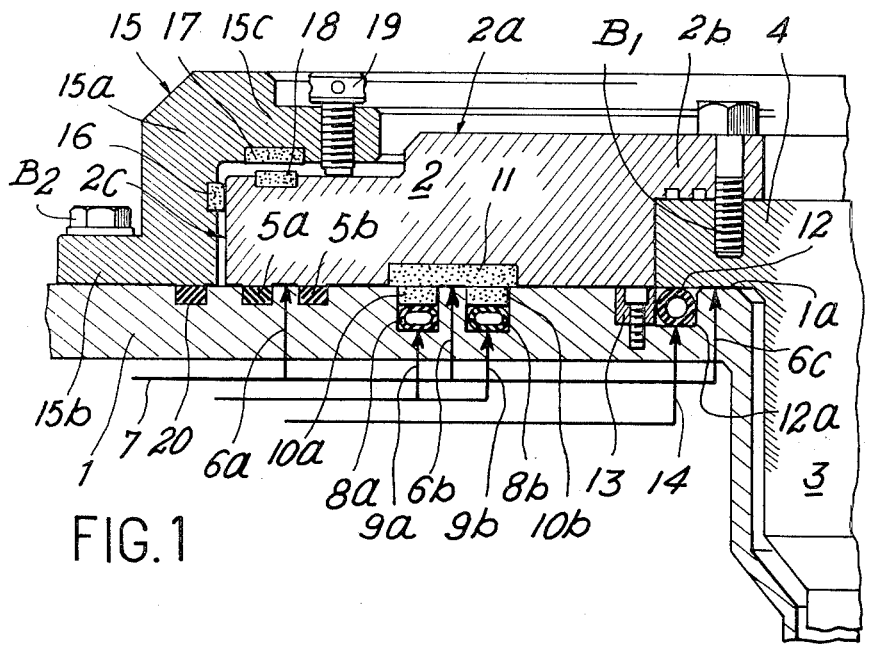

United States Patent [19]

Jacquelin

[11] 3,819,479
[45] June 25, 1974

[54] SUPPORTING AND SEALING DEVICE APPLICABLE TO ROTARY SEAL PLUGS IN NUCLEAR REACTOR SHIELD SLABS

[75] Inventor: Roland Jacquelin, Manosque, France

[73] Assignee: Commissariat A L'Energie Atomique, Paris, France

[22] Filed: Oct. 2, 1972

[21] Appl. No.: 294,366

[30] Foreign Application Priority Data
Oct. 6, 1971 France ............................. 71.35970

[52] U.S. Cl. .................. 176/87, 220/24 R, 49/477, 49/484, 49/485
[51] Int. Cl. ........................................... G21c 13/06
[58] Field of Search .................. 176/87, 30, 31, 32; 220/24; 49/477, 485, 484

[56] References Cited
UNITED STATES PATENTS
3,514,115 5/1970 Gallo .............................. 176/87 X
3,633,784 1/1972 Taft .................................. 176/87 X
3,698,724 10/1972 Blachere et al. ................... 176/87 X FOREIGN PATENTS OR APPLICATIONS
1,921,377 11/1970 Germany ............................. 176/87

Primary Examiner—Carl D. Quarforth
Assistant Examiner—P. K. Pavey
Attorney, Agent, or Firm—Ernest F. Marmorek

[57] ABSTRACT

The top face of the reactor shield slab is provided in the portion adjacent to the seal plug opening with a flat bearing rim which supports the annular flange of the plug and is slightly raised with respect to the remainder of the slab.

Provision is made between the plug flange and the top slab face for sealing means consisting of flexible O-ring seals, sliding means consisting of friction slideways, lifting means consisting of inflatable seals, ducts being provided in the slab for injecting a barrier of neutral gas under pressure.

5 Claims, 2 Drawing Figures

SUPPORTING AND SEALING DEVICE APPLICABLE TO ROTARY SEAL PLUGS IN NUCLEAR REACTOR SHIELD SLABS

This invention relates to a device for supporting in leak-tight manner a seal plug mounted in a shield slab which is placed over the pressure vessel of a nuclear reactor, especially a fast reactor, and for permitting the movement of rotation of said seal plug with respect to the shield slab.

The arrangement of a rotary seal plug within the closure or shield slab of a nuclear reactor is such that the movements of rotation of the plug make it possible in particular to perform different handling operations within the pressure vessel. However, this arrangement gives rise to difficulties in maintaining leak-tightness of said plug while also ensuring correct supporting and centering of this latter. In fact, the loads applied by the seal plug to its bearing structure which may consist of a ring of balls, for example, can attain 350tons or more in the case of some types of power reactor; moreover, the permissible tolerances in respect of faulty centering of the seal plug during movements of rotation of this latter must not exceed a few millimeters in order to comply with the standard of accuracy required by devices employed for performing handling operations through the plug and within the interior of the pressure vessel. The sealing means employed such as liquid metal seals must guard against any leakage of inert gas which is present within the pressure vessel above the liquid metal employed for cooling the reactor core, and must remain effective both during reactor operation and during operations involved in handling fuel assemblies at the time of reactor shutdown. Finally, the means for providing support, rotary motion and leak-tightness must be readily accessible for maintenance, repair and possible replacements.

The present invention relates to a supporting and sealing device for a rotary seal plug mounted in a horizontal shield slab which provides a closure for a nuclear reactor pressure vessel, and device being such as to ensure satisfactory compliance with the essential requirements stated in the foregoing.

In a known manner, the horizontal shield slab is provided with a circular opening which has a vertical axis and accommodates the seal plug, said plug being fitted with a radial cylindrical annular flange having a diameter which is substantially larger than that of the opening, sealing and sliding means being provided between the bottom face of the radial annular flange and a seating formed in the top face of the shield slab.

In accordance with the invention, the seating of the top face of the slab is provided in the portion adjacent to the plug opening with a flat bearing rim which supports the annular flange and is slightly raised with respect to the remainder of the slab, the sealing and sliding means as well as the means for lifting the seal plug in the vertical direction being placed between the annular flange and the top face of the slab externally of the bearing rim.

Preferably, the sealing means comprise at least two O-ring seals of different diameter which are mounted coaxially with the seal plug and form between them in the top face of the slab an annular zone into which open ducts for injecting a barrier of neutral gas under pressure.

For the primary object of permitting rotation of the seal plug about its axis, the lifting means comprise pneumatic chambers in the form of toroidal elements having resilient walls, said chambers which are placed within open annular recesses formed in the top face of the slab in oppositely facing relation to the radial annular flange are connected to a source of inflation which causes expansion of said chambers and lifting of friction rings placed within said recesses above the chambers and provided with a sliding face adapted to bear against a slideway which is rigidly fixed to the radial annular flange. The rings are advantageously fabricated from a material having a low coefficient of friction and high crushing strength, especially polytetrafluoroethylene.

The pneumatic chambers thus produce in conjunction with the slide rings a sealing-ring effect both in the inflated state for movements of rotation of the seal plug and in the non-inflated state at the time of operation of the reactor, the seal plug being stationary and its radial annular flange being applied by means of a metal-to-metal contact against the slightly raised flat rim of the slab seating.

Preferably, the diameters of the pneumatic chambers within their recesses are smaller than those of the O-ring seals.

Figure 2:
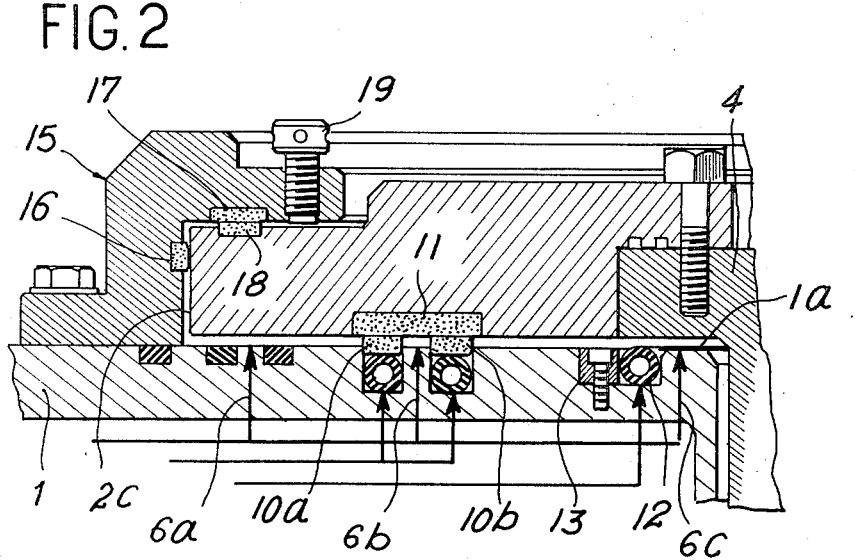

Further characteristic features of the device according to the invention will become apparent from the following description of one exemplified embodiment which is given by way of indication and not in any limiting sense, reference being made to the accompanying drawings, in which:

FIG. 1 is a radial sectional view which has been partly cut away and shows a rotary seal plug mounted in a shield slab which serves to close the pressure vessel of a nuclear reactor, the seal plug and the slab being equipped with a supporting and sealing device in accordance with the invention; and FIG. 2 illustrates the same elements as in FIG. 1, with the seal plug lifted from the slab.

In FIGS. 1 and 2, the reference 1 designates a horizontal shield slab for closing the pressure vessel of a nuclear reactor (not shown), there being applied against said slab a radial annular flange 2 which forms part of a cylindrical seal plug 3 having a vertical axis. Said plug is engaged within an opening formed in the slab 1 and is intended to permit by means of devices (not illustrated) which are connected to said seal plug different handling operations within the pressure vessel which is closed by the slab 1. The annular flange 2 has a top strengthening projection 2a while the internal lateral face of said flange has a stepped profile forming a portion 2b of smaller thickness which can be fitted with bolts $B_1$ for attaching said flange to the body of the seal plug 3 by means of a radial annular shoulder 4. Said shouldered portion also has a stepped profile and has dimensions which are adapted to those of the annular flange 2 in order that the contacting portions of said annular shoulder and of the annular flange should extend in a common horizontal plane located at right angles to the axis of the seal plug 3.

In accordance with a characteristic arrangement of the invention, the slab 1 is provided in the portion adjacent to the opening in which the seal plug 3 is engaged with a flat bearing rim 1a which is slightly raised (of the order of 1/10 mm) with respect to the remainder of the top face of said slab. Said rim supports the seal plug directly by means of the annular shoulder 4 of said plug and establishes a metal-to-metal contact between the two perfectly trued opposite faces. In order that leak-tightness between the slab 1 and the annular flange 2 which is attached to the plug 3 should also be ensured when the annular shoulder 4 of said plug rests on the rim 1a as mentioned above, use is made of O-ring seals 5a and 5b of relatively flexible material having a small transverse cross-section with respect to their diameter, said annular seals 5a and 5b being engaged within grooves which are formed coaxially with the plug opening in the slab 1 and open towards the top face of said slab in that portion which is covered by the annular flange 2. Ducts such as the duct 6a are arranged vertically at intervals within the slab 1 and extend from a radial pipe 7; these ducts serve to establish a barrier of neutral gas under pressure, thus providing a means of controlling the leak-tightness obtained on each side of the seals 5a and 5b.

Also in accordance with the invention, the slab 1 supports two additional O-ring seals or toroidal elements 8a, 8b of elastic material having cross-sections which are substantially larger than those of the seals 5a and 5b and constituting annular chambers which are capable of undergoing limited expansion under the action of a compressed inflation gas, as shown in FIGS. 1 and 2. Each element 8a and 8b is mounted in the bottom of a circular recess formed in the slab 1, said recesses being comparable with the grooves of the seals 5a and 5b but having a greater depth and a smaller diameter. Vertical ducts 6b are also provided at intervals between the elements 8a and 8b in order to set up a further barrier of the sealing gas supplied from the pipe 7. Moreover, the annular chambers formed within the elements 8a and 8b are connected to inflating means (not shown) by means of ducts 9a, 9b which are suitably arranged within the slab 1 and serve to deform said elements by applying a suitable lifting force to the annular flange 2 and the seal plug 3 which is attached thereto.

Accordingly, in order to carry out lifting of the seal plug, rings 10a and 10b of polytetrafluoroethylene having a substantially rectangular cross-section and radial dimensions adapted to those of the recesses provided for the elements 8a and 8b are mounted above these latter so as to be brought flush with the top face of the slab 1 beneath the annular flange 2. Another ring 11 of polytetrafluoroethylene forming a slideway is forcibly mounted within a groove formed coaxially with the seal plug 3 within the annular flange 2, the relatively substantial cross-sectional width of said ring 11 being substantially larger than the overall radial width of the rings 10 in order to cover these latter. Finally, another inflatable element 12 which is similar to the elements 8a and 8b can be fitted within a separate groove 12a which is formed coaxially with the opening of the seal plug 3 in that zone of the slab 1 which is close to the plug; said groove extends in the radial direction on each side of the contact surface between the lateral faces of the annular shoulder 4 and of the annular flange 2. A packing-piece 13 which is preferably constituted by a plurality of segments is mounted in the portion of larger diameter of the groove 12a beneath the annular flange 2 while the inflatable element 12 is located beneath the annular shoulder 4 of the plug 3. Inflating means (not shown) are also connected to the element 12 by means of a duct 14 arranged within the slab 1. Ducts 6c which are identical with the ducts 6a and 6b provide from the pipe 7 an additional sealing barrier in the direction of the seal plug opening in the slab 1. The ducts 6a, 6b and 6c are fitted with regulating valves (not illustrated) which serve to carry out selective injection of the barrier gas in those zones into which said ducts open between the slab 1 and the annular flange 2.

The equipment of the slab-plug assembly as hereinabove described is completed by means of a clamping collar 15 having preferably a radial cross-section composed of a vertical central portion of web 15a and of two flanges 15b and 15c disposed at right angles, respectively at the base of the external lateral face and at the top portion of the internal lateral face of the web 15a. The diameter of said internal face is slightly larger than that of the lateral end face 2c of the annular flange 2, the clamping collar 15 being attached to the slab 1 coaxially with the opening of the seal plug 3 by means of bolts $B_2$ engaged in internally-threaded bores of the flange 15b while the other flange 15c covers a substantial portion of the annular flange 2 without being in direct contact with this latter. Studs 16 of polytetrafluoroethylene are forcibly mounted within recesses located at uniform intervals on the internal face of the web 15a, said studs being applied against the suitably machined face 2c in order that the annular flange 2 may be guided by said studs at the time of a movement of rotation of the seal plug 3. Two rings 17 and 18, also formed of polytetrafluoroethylene and similar to the ring 11 but being of smaller transverse cross-section than this latter, are forcibly mounted within grooves formed opposite to each other in the flange 15c and in the annular flange 2, said grooves being coaxial with the seal plug 3. By way of alternative, the ring 17 and even the ring 18 may be dispensed with, in which case the corresponding slideways are formed directly by the portions of polished surfaces of the clamping collar 15 and of the annular flange 2. Finally, screws 19 having relative dimensions adapted to high values of stress are screwed into internally threaded bores formed at intervals in the flange 15c of the clamping collar 15 in order to constitute jacks for clamping the annular flange 2 against the slab 1.

In the position shown in FIG. 1, the load of the seal plug 3 is carried directly by the slab 1 by virtue of the annular shoulder 4 which is applied against the slightly raised flat rim 1a, thereby ensuring a positive contact between these two components while the screw-type jacks 19 prevent any accidental lifting of the seal plug 3 which is locked in position when the reactor is in operation. During this operation, leak-tightness is ensured by means of the seals 5a and 5b and a barrier-gas atmosphere usually consisting of argon and injected through the ducts 6a serves to check the effectiveness of said seals. As an advantageous feature, a slight inflation of the chambers of the elements 8a and 8b ensures lifting of the rings 10a and 10b which come into contact with the ring 11, thus providing additional protection for the seals 5a and 5b. The element 12 is not in service and therefore not inflated.

In the position illustrated in FIG. 1 in which the reactor is no longer in operation, the seal plug 3 can be subjected to any movement of rotation by standard drive means (not shown), especially in order to carry out necessary handling operations within the reactor vessel. To end this, the screw-type jacks 19 are unscrewed and the elements 8a and 8b are more completely inflated in order to lift the seal plug 3, with the result that the rings 17, 18 are applied in contact with each other so as to ensure that the seal plug is suitably supported. Lifting to a height of 5 to 6 mm in particular is usually sufficient to ensure that the movement of rotation can take place without any danger of friction between the annular flange 2 and the seals 5a and 5b. During this rotation, the rings 10 and 11 on the one hand and 17 and 18 on the other hand perform the function of slideways and also ensure good leak-tightness of the annular flange 2. Additional leak-tightness can be obtained by injecting gas through the duct 6b and if necessary by means of an O-ring seal 20 which is fitted between the slab 1 and the annular flange 2 externally of the seals 5a and 5 b. During this movement of rotation, the studs 16 serve to guide the annular flange while preventing any jamming. It should be noted that the clamping collar 15 could be replaced without any difficulty by simple cleats rigidly fixed to the slab 1 and equipped with slideway elements, studs and jacks in order to produce similar results.

Finally, it is apparent from the foregoing explanations that the clamping collar 15 or the corresponding cleats can be readily disassembled in order to gain access to the seal 20 or to the rings 17 and 18 and replace these latter if necessary. Similarly, it is also possible to reach the elements 5a, 5b, 8a, 8b, 10a and 10b by removing the annular flange 2 after having inflated the element 12 in order to maintain leak-tightness. It would also be possible to replace said element 12 by disassembling the segements which form the ring 13 after removing the annular flange 2. In that case, it would prove sufficient to make temporary use of the leak-tightness provided by the annular shoulder 4 as this latter bears on the rim 1a, to which may be added if necessary a gas barrier formed by injection under pressure through the duct 6c.

It is wholly apparent that this invention is not limited to the exemplified embodiment described in the foregoing but extends to any alternative forms which are within reach of those skilled in the art.

What we claim is:

1. A device for supporting, sealing and lifting a rotary plug mounted in a slab closing a pressure vessel of a nuclear reactor, said slab having an upper horizontal face and comprising a circular opening defined therein having a vertical axis, said plug being stationary when said reactor is in operation and being able to be actuated in rotation when said reactor operation is stopped, said plug being provided with a central part coaxial with and engaged within said slab opening and a radial horizontal and cylindrical flange having bottom and top faces parallel to said slab, said device comprising:

a sealing means mounted between said bottom face of said flange and said upper face of said slab;

a flat bearing rim for supporting said plug when stationary, said rim being provided on said upper face of said slab;

a rotary sliding means for said plug when rotating, including at least two friction slideways in contact with each other and respectively carried by said bottom face of said plug flange and by said upper face of said slab, one of said slideways on said slab being made with at least two separate friction rings, coaxial with said slab opening, said two friction rings being separated by an annular zone and ducts for injecting a barrier of neutral gas under pressure opening in said annular zone, the other of said slideways being carried by the bottom face of said plug flange and comprising a single third friction ring larger than the overall radial width of said two friction rings in the upper face of said slab;

a lifting means for lifting said plug in a vertical direction, comprising annular inflatable chambers for applying a vertical action of said bottom face of said flange by the intermediary of said friction rings in said upper face of said slab, each annular inflatable chamber being fitted in an open recess defined in said slab and closed by one of said friction rings movable in said slab recess;

a connecting means for connecting said inflatable chambers to an inflation source for producing an expansion of said chambers; and a centering means for centering and guiding said plug flange during lifting and rotating operations of said plug, comprising friction studs fitted in a collar coaxial with and surrounding laterally said plug flange, said studs bearing on a cylindrical external surface of said plug flange.

2. A device as claimed in claim 1, wherein said sealing means comprise at least two flexible O-ring seals of different diameter, mounted coaxially with said slab opening, said seals forming in said upper face of said slab said annular zone.

3. A device as claimed in claim 1, wherein said collar comprises a flat extension portion, parallel to the top face of said plug flange and clamping means mounted in said extension for locking said plug flange against said bearing rim, said clamping means comprising screw-type jacks carried by said extension portion.

4. A device as claimed in claim 3, wherein said extension portion comprises a fourth friction ring, able to contact a fifth friction ring mounted in the top face of said plug flange when said plug is lifted from said rim by said lifting means.

5. A device as claimed in claim 1, wherein auxiliary sealing means are provided in the upper face of said slab for bearing against the bottom face of said plug flange, said auxiliary sealing means comprising an inflatable seal mounted in a groove defined in the upper face of said rim.

* * * * *